United States Patent
Mochizuki

(10) Patent No.: US 9,528,677 B2
(45) Date of Patent: Dec. 27, 2016

(54) VEHICLE LAMP UNIT AND VEHICLE HEADLAMP

(71) Applicant: KOITO MANUFACTURING CO., LTD., Minato-ku, Tokyo (JP)

(72) Inventor: Kazuma Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/763,680

(22) PCT Filed: Jan. 27, 2014

(86) PCT No.: PCT/JP2014/051688
§ 371 (c)(1),
(2) Date: Jul. 27, 2015

(87) PCT Pub. No.: WO2014/115875
PCT Pub. Date: Jul. 31, 2014

(65) Prior Publication Data
US 2015/0362146 A1 Dec. 17, 2015

(30) Foreign Application Priority Data

Jan. 28, 2013 (JP) ................................. 2013-013405
Jan. 28, 2013 (JP) ................................. 2013-013406

(51) Int. Cl.
| | | |
|---|---|---|
| *F21S 8/10* | (2006.01) | |
| *B60Q 1/04* | (2006.01) | |
| *B60Q 1/14* | (2006.01) | |

(52) U.S. Cl.
CPC ......... *F21S 48/1778* (2013.01); *B60Q 1/0408* (2013.01); *B60Q 1/1438* (2013.01);
(Continued)

(58) Field of Classification Search
CPC .. F21S 48/1778; F21S 48/1159; F21S 48/142; F21S 48/325; F21S 48/1768; F21S 48/1784; F21S 48/1789; F21S 48/1794; F21S 48/14; F21S 48/1763; B60Q 1/0408; B60Q 1/1438; F21V 1/10; F21V 11/18; F21V 11/183; F21V 14/08
See application file for complete search history.

(56) References Cited

U.S. PATENT DOCUMENTS 5,768,933 A 6/1998 Tanner et al.
6,796,692 B2 * 9/2004 Nakada ............... F21S 48/1784
362/319

(Continued)

FOREIGN PATENT DOCUMENTS

EP 2228588 A2 9/2010
EP 2228588 A3 9/2010
(Continued)

OTHER PUBLICATIONS

Search Report dated Apr. 8, 2014 issued by the International Searching Authority in International Application No. PCT/JP2014/051688 (PCT/ISA/210).

(Continued)

*Primary Examiner* — Bao Q Truong
(74) *Attorney, Agent, or Firm* — Sughrue Mion, PLLC

(57) ABSTRACT

A movable shade (17) is capable of being pivoted about a pivot shaft (19), and switches a shielded amount of light emitted from a light source in accordance with a pivot amount. A solenoid (21) has an output shaft (41) capable of being axially moved. A link member (20) is connected to the output shaft (41), and is displaced in conjunction with a movement of the output shaft (41). A projection (28) is provided on the movable shade (17). A sliding contact portion (37) is provided on the link member (20), and abutted against the projection (28). The movable shade (17) is configured in such a manner as to be pivoted about the pivot shaft (19) when the projection (28) slides on the sliding (Continued)

contact portion (37) in accordance with a displacement of the link member (20). A surface (28a) of the projection (28) is formed as a curved surface.

5 Claims, 8 Drawing Sheets

(52) U.S. Cl.
CPC ......... *F21S 48/1159* (2013.01); *F21S 48/142* (2013.01); *F21S 48/325* (2013.01)

(56) References Cited

U.S. PATENT DOCUMENTS

| | | | | |
|---|---|---|---|---|
| 7,267,465 | B2* | 9/2007 | Mochizuki | F21S 48/1778 362/507 |
| 7,837,367 | B2* | 11/2010 | Huang | F21S 48/1773 362/512 |
| 2011/0170308 | A1 | 7/2011 | Kinoshita et al. | |
| 2014/0092617 | A1* | 4/2014 | Yokoi | F21S 48/1794 362/512 |

FOREIGN PATENT DOCUMENTS

| | | | |
|---|---|---|---|
| JP | 9-512623 | A | 12/1997 |
| JP | 2001-349406 | A | 12/2001 |
| JP | 2007-78157 | A | 3/2007 |
| JP | 2007-80521 | A | 3/2007 |
| JP | 2007-213938 | A | 8/2007 |
| JP | 2007-294203 | A | 11/2007 |
| JP | 2010-123403 | A | 6/2010 |
| JP | 2010-218728 | A | 9/2010 |
| JP | 2012-190597 | A | 10/2012 |

OTHER PUBLICATIONS

Written Opinion dated Apr. 8, 2014 issued by the International Searching Authority in International Application No. PCT/JP2014/051688 (PCT/ISA/237).
Communication issued Sep. 21, 2016, issued by the Japanese Patent Office in counterpart Japanese Patent Application No. 2013-013406.
Communication issued Sep. 26, 2016, issued by the State Intellectual Property Office of the People's Republic of China in counterpart Chinese Patent Application No. 201480006413.9.
Communication issued Sep. 30, 2016, issued by the Japanese Patent Office in counterpart Japanese Patent Application No. 2013-013405.
Communication issued Oct. 21, 2016, issued by the European Patent Office in counterpart European Patent Application No. 14743455.9.

\* cited by examiner

VEHICLE LAMP UNIT AND VEHICLE HEADLAMP

TECHNICAL FIELD

The present invention relates to a lamp unit that is mounted on a vehicle. Further, the present invention relates to a vehicle headlamp including the lamp unit.

BACKGROUND ART

For example, there is known a vehicle headlamp where a lamp unit including a light source or the like is disposed inside a lamp outer casing that is configured by a cover and a lamp housing.

In such a lamp unit, a light quantity control mechanism for controlling the amount of light emitted from the light source is provided. The light quantity control mechanism includes a movable shade for changing the shielded amount of light emitted from the light source and a solenoid for actuating the movable shade (e.g., see FIG. 4 in Patent Document 1).

In the vehicle headlamp disclosed in Patent Document 1, an output shaft of the solenoid disposed on the front side and the movable shade disposed on the rear of the solenoid are connected to each other by a wire-like arm (link member). One end of the arm is rotatably connected to the output shaft and the other end (bent portion) thereof is slidably abutted against an engaging portion of the movable shade.

When the output shaft of the solenoid is moved in a left-right direction, the arm is rotated and the bent portion of the arm slides on the engaging portion of the movable shade. In this way, the movable shade is pivoted about a pivot shaft extending laterally.

As the movable shade is pivoted to a first position, the vehicle headlamp is switched to a low beam mode where a short distance ahead of a vehicle is irradiated. As the movable shade is pivoted to a second position, the vehicle headlamp is switched to a high beam mode where a long distance ahead of the vehicle is irradiated.

CITATION LIST

Patent Document

Patent Document 1: Japanese Patent Laid-Open Publication No. 2007-213938

DISCLOSURE OF INVENTION

Problems to be Solved by Invention

However, in the vehicle headlamp disclosed in Patent Document 1, the bent portion of the arm slides on an end edge of the engaging portion, i.e., an angular portion when the output shaft is moved in the left-right direction and the arm is thus rotated.

Accordingly, the angular portions are in sliding contact with each other and therefore it is difficult to secure the smooth linkage. As a result, a decrease in the operating efficiency is caused. In this case where the operating efficiency is low, it becomes necessary to use a solenoid having a larger driving force, correspondingly. Thus, there is a problem that an increase in size of the solenoid and an increase in cost are caused.

Therefore, a first object of the present invention is to improve the operating efficiency of the movable shade.

Further, in the type, such as the lamp unit disclosed in Patent Document 1, where a movable shade for controlling the light emitted from the light source is provided, the weight balance of the movable shade becomes worse (it is difficult to place the center of the movable shade on the rotation axis) in the case of the configuration that most of the movable shade is disposed on the front side or rear side of the pivot shaft, for example. In this case, in order to prevent the movable shade from being rotated by vibration or the like, it is necessary to increase the biasing force of a spring or the like that fixes the movable shade to a predetermined position. In order to pivot the movable shade against the biasing force, it is necessary to use a large actuator having a large driving force. As a result, it is difficult to achieve a decrease in size of the lamp unit or a decrease in manufacturing cost.

Further, in the configuration that most of the movable shade is disposed on the front side or rear side of the pivot shaft, it is necessary to mount a counterweight to the movable shade in order to secure the weight balance. However, in this case, the whole weight of the movable shade is increased. Accordingly, similarly, it is necessary to use an actuator having a large driving force.

Therefore, a second object of the present invention is to reduce the size of the lamp unit while suppressing an increase in weight of the movable shade.

Means for Solving the Problems

In order to achieve the first object, a first aspect that can be taken by the present invention provides a lamp unit that is mounted on a vehicle. The lamp unit includes a light source;

a movable shade that is capable of being pivoted about a pivot shaft and switches a shielded amount of light emitted from the light source in accordance with a pivot amount;

an actuator having an output shaft that can be axially moved;

a link member that is connected to the output shaft and displaced in conjunction with a movement of the output shaft;

a first sliding contact member provided on the movable shade; and a second sliding contact member that is provided on the link member and abutted against the first sliding contact member, in which the movable shade is configured to be pivoted about the pivot shaft when the first sliding contact member slides on the second sliding contact member in accordance with a displacement of the link member, and in which a surface of one of the first sliding contact member and the second sliding contact member is formed as a curved surface.

According to this configuration, the surface of one of the first sliding contact member and the second sliding contact member, which are in sliding contact with each other when the output shaft is moved, is configured as a curved surface. Therefore, the movable shade is smoothly interlocked with the link member. As a result, an operating efficiency of the movable shade is improved.

An extension direction of the pivot shaft may coincide with a movement direction of the output shaft.

According to this configuration, it is not required to secure a moving space of the output shaft in a direction perpendicular to the extension direction of the pivot shaft. As a result, it is possible to reduce the size of the lamp unit in the direction perpendicular to the extension direction of the pivot shaft of the movable shade while improving the operating efficiency of the movable shade.

The curved surface may be configured as a portion of a spherical surface.

According to this configuration, the contact area between the first sliding contact member and the second sliding contact member in the sliding contact is small, so that the link member and the movable shade are more smoothly interlocked. As a result, the operating efficiency of the movable shade is further improved.

The other of the first sliding contact member and the second sliding contact member may have a plane in contact with the curved surface.

According to this configuration, one of the first sliding contact member and the second sliding contact member is always in point-contact with the other thereof, so that the link member and the movable shade are more smoothly interlocked. As a result, the operating efficiency of the movable shade is further improved.

In order to achieve the first object, a second aspect that can be taken by the present invention provides a headlamp that is mounted on a vehicle. The headlamp includes
  a lamp housing having an opening in at least one side;
  a cover defining a lamp chamber together with the lamp housing by covering the opening; and
  the lamp unit according to the first aspect.

According to this configuration, the headlamp includes the lamp unit in which the operating efficiency of the movable shade is improved. As a result, it is possible to provide the small-sized vehicle headlamp at low cost.

In order to achieve the second object, a third aspect that can be taken by the present invention provides a lamp unit that is mounted on a vehicle. The lamp unit includes
  a light source;
  a movable shade that is capable of being pivoted about a pivot shaft and switches a shielded amount of light emitted from the light source in accordance with a pivot amount; and
  an actuator for pivoting the movable shade,
  in which one of the upper end and the lower end of the movable shade is located on the front side of the pivot shaft and the other thereof is located on the rear side of the pivot shaft.

According to this configuration, the upper end and the lower end of the movable shade are located on the front and rear sides sandwiching the pivot shaft. In other words, the pivot shaft is disposed between the upper end and the lower end of the movable shade. Accordingly, the good weight balance of the movable shade is ensured without additionally providing a counterweight or the like. In this way, as the actuator for pivoting the movable shade, a small-sized actuator having a small driving force can be used. As a result, it is possible to reduce the size of the lamp unit while suppressing an increase in weight of the movable shade.

The upper end of the movable shade may be located on the rear side of the pivot shaft and the lower end of the movable shade may be located on the front side of the pivot shaft.

According to this configuration, it can be avoided that the lower end of the movable shade is brought into contact with the light source or the like located on the rear side. Accordingly, when reducing the size of the lamp unit while suppressing the increase in weight of the movable shade, an effective usage of a space and an easy design can be achieved.

The lamp unit may include a support plate for supporting the pivot shaft, the support plate may include a pair of light shielding portions for shielding a portion of the light emitted from the light source, and on the rear side of the movable shade, the pair of light shielding portions may be arranged so as to be spaced apart in the extension direction of the pivot shaft.

According to this configuration, light is shielded by the shielding portions, regardless of the position of the movable shade. As a result, when reducing the size of the lamp unit while suppressing the increase in weight of the movable shade, it is possible to suppress the influence on the light distribution pattern by the light passing through the periphery of the movable shade.

A biasing spring for biasing the movable shade in one direction may be provided, and the biasing spring may be located on the rear side of the movable shade.

According to this configuration, it can be avoided that the light emitted to the front side of the movable shade is reflected and shielded by the biasing spring or a member for supporting the biasing spring. As a result, it is possible to form a good light distribution pattern even while suppressing the increase in weight of the movable shade and reducing the size of the lamp unit.

In order to achieve the second object, a fourth aspect that can be taken by the present invention provides a headlamp that is mounted on a vehicle. The headlamp includes
  a lamp housing having an opening in at least one side;
  a cover defining a lamp chamber together with the lamp housing by covering the opening; and
  the lamp unit according to the third aspect.

According to this configuration, the headlamp includes the small-sized lamp unit while suppressing the increase in weight of the movable shade. As a result, it is possible to provide the small-sized vehicle headlamp at low cost.

EMBODIMENT FOR CARRYING OUT INVENTION

Hereinafter, an exemplary embodiment of a vehicle headlamp according to the present invention will be described with reference to the accompanying drawings.

A vehicle headlamp 1 is mounted and arranged on both left and right ends in the front end portion of a vehicle body, respectively.

Figure 1:
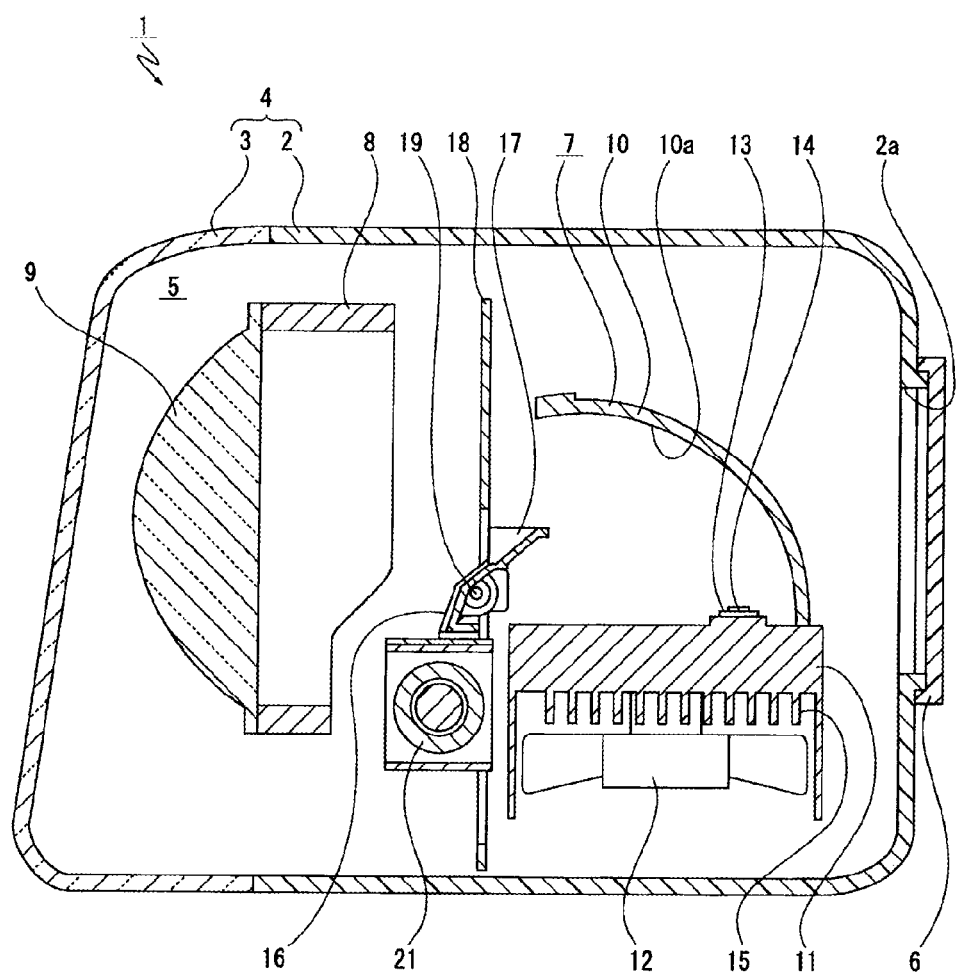
FIG. 1 is a longitudinal sectional view schematically showing a configuration of a headlamp including a lamp unit according to an exemplary embodiment of the present invention.

The vehicle headlamp 1 includes a lamp housing 2 and a cover 3 (see FIG. 1). The lamp housing 2 has a recess that is opened to the front. The cover 3 closes the opening of the lamp housing 2. A lamp outer casing 4 is configured by the lamp housing 2 and the cover 3. An internal space of the lamp outer casing 4 is defined as a lamp chamber 5.

A mounting hole 2a penetrates, back and forth, the rear end portion of the lamp housing 2. A back cover 6 is mounted to the mounting hole 2a.

A lamp unit 7 is disposed in the lamp chamber 5. The lamp unit 7 includes a lens holder 8, a projection lens 9 mounted to the front end of the lens holder 8, a reflector 10 for reflecting light, a light source unit 11 disposed below the reflector 10, and a cooling fan 12 disposed on the lower surface side of the light source unit 11.

The projection lens 9 is formed in a substantially hemispherical shape and mounted to the lens holder 8.

An inner surface of the reflector 10 is formed as a reflective surface 10a. The reflector 10 is mounted on the upper surface of the light source unit 11.

The light source unit 11 includes a circuit board 13 and a light source 14 mounted on the upper surface of the circuit board 13. For example, a light emitting diode (LED) is used as the light source 14. A heat sink 15 is provided on the lower side of the circuit board 13 of the light source unit 11. The cooling fan 12 is disposed inside of the heat sink 15.

A light quantity control mechanism 16 is disposed on the front side of the light source unit 11.

Figure 2:
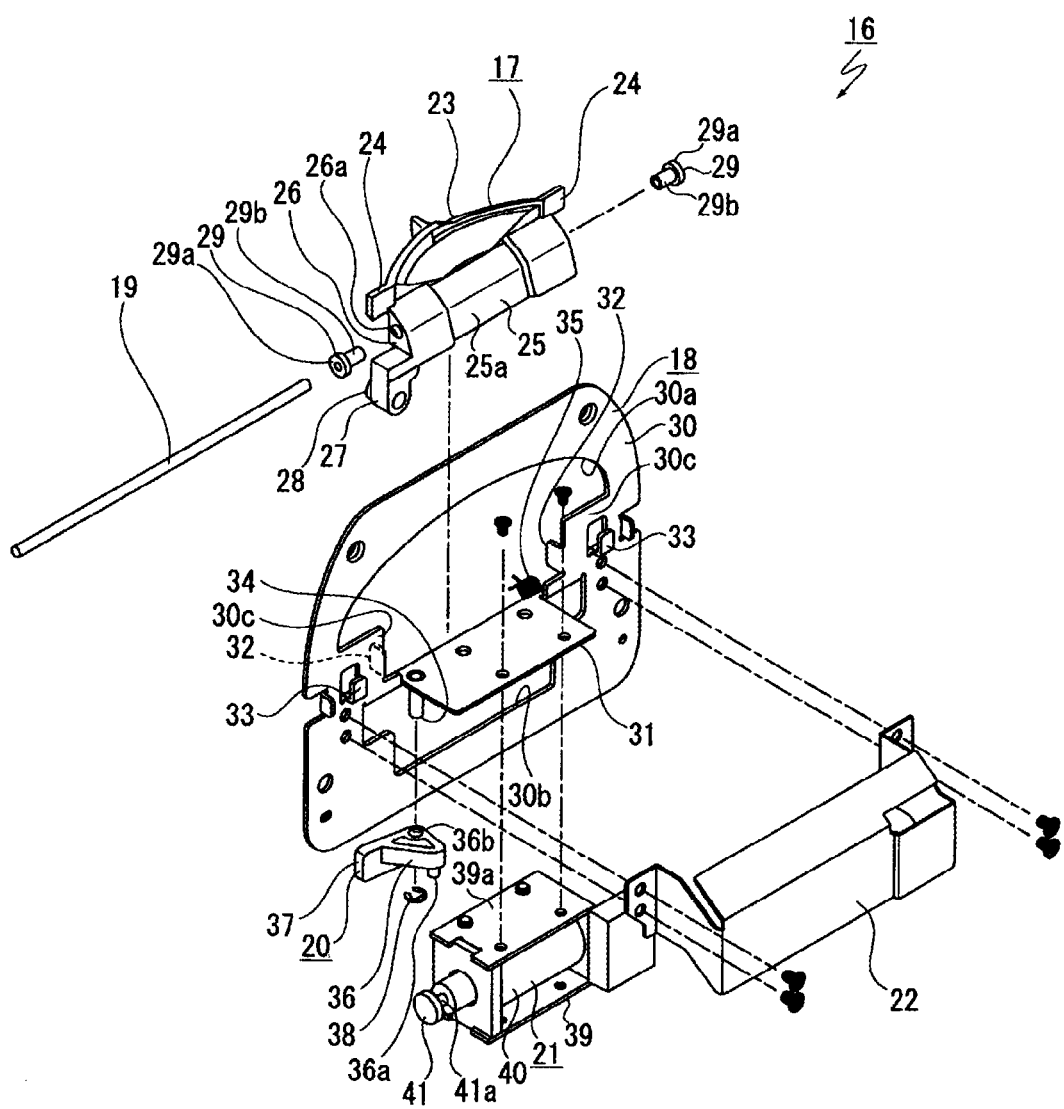
FIG. 2 is an exploded perspective view of a light quantity control mechanism included in the lamp unit.

The light quantity control mechanism 16 includes a movable shade 17, a support plate 18, a pivot shaft 19, a link member 20, a solenoid 21 and a cover body 22 (see FIG. 1 and FIG. 2).

The movable shade 17 includes a light quantity control portion 23, regulation protrusions 24, 24, an inclined surface portion 25, supported portions 26, 26, and a slide portion 27. The light quantity control portion 23 is formed in a substantially arc-surface shape. The regulation protrusions 24, 24 protrude outwardly (laterally), respectively, from both left and right ends of the light quantity control portion 23. The inclined surface portion 25 is provided continuously to the lower side of the light quantity control portion 23. The supported portions 26, 26 protrude rearward, respectively, from both left and right ends of the inclined surface portion 25. The slide portion 27 is provided continuously to one end in the left-right direction of the inclined surface portion 25.

The inclined surface portion 25 is inclined so as to be displaced to the front toward the lower side. A shallow recess 25a is formed at the portion of the inclined surface portion 25 excluding both left and right ends on the front surface side.

The supported portions 26, 26 are formed with mounting holes 26a, 26a penetrating in the left-right direction.

A protrusion 28 (an example of a first sliding contact member) is provided on the rear surface of the slide portion 27 and protruded rearward. The protrusion 28 is formed, for example, in a substantially hemispherical shape and a surface 28a thereof is configured as a portion of a spherical surface. In addition, the shape of the surface 28a is not limited to a portion of the spherical surface. At least a portion of the surface 28a may be formed as a curved surface.

Bearings 29, 29 are respectively mounted to the supported portions 26, 26. The bearing 29 is configured by a large-diameter portion 29a and a small-diameter portion 29b. The small-diameter portion 29b is inserted into the mounting hole 26a, so that the bearing 29 is mounted to the supported portion 26. The large-diameter portion 29a is disposed on the outside of the supported portion 26.

The support plate 18 includes a base surface portion 30 facing the front-rear direction and a mounting surface portion 31 protruding forward from the base surface portion 30.

The base surface portion 30 includes a light passing hole 30a and a placement hole 30b, which are formed so as to be spaced apart in the vertical direction. The portion in the vicinity of the light passing hole 30a of the base surface portion 30 functions as a fixing shade for shielding a portion of light emitted from the light source 14. Bearing pressing pieces 32, 32 are provided on an opening edge of the light passing hole 30a and protruded rearward. The bearing pressing pieces 32, 32 are spaced apart in the left-right direction.

Out of the base surface portion 30 of the support plate 18, the portions, which are respectively located on the outside of the left-right direction of the bearing pressing pieces 32, 32, are provided as light shielding portions 30c, 30c. The light shielding portions 30c, 30c are arranged so as to be spaced apart in the left-right direction.

The support plate 18 is provided with shaft mounting portions 33, 33. The shaft mounting portions 33, 33 are respectively located on the outside of the left-right direction of the bearing pressing pieces 32, 32. The shaft mounting portions 33, 33 are protruded rearward.

The mounting surface portion 31 is protruded forward from a lower opening edge of the light passing hole 30a. A support shaft 34 is provided on one end in the left-right direction of the mounting surface portion 31 and protruded downward.

The pivot shaft 19 is fixed to the support plate 18 in a state of being extended in the left-right direction. The pivot shaft 19 is inserted into the bearings 29, 29 mounted to the movable shade 17. The portion in the vicinity of both left and right ends of the pivot shaft 19 is inserted into the shaft mounting pieces 33, 33 from above. The shaft mounting pieces 33, 33 are bent and crimped, so that the pivot shaft 19 is fixed to the front surface side of the support plate 18.

Figure 3:
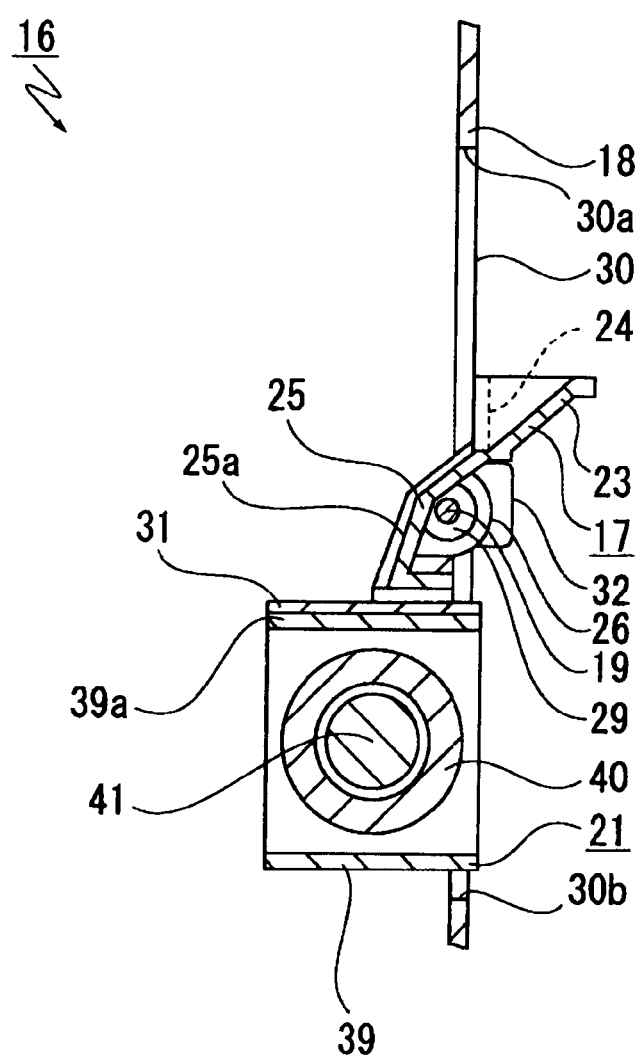
FIG. 3 is a longitudinal sectional view showing a state where a movable shade included in the lamp unit is held in a first position.
Figure 4:
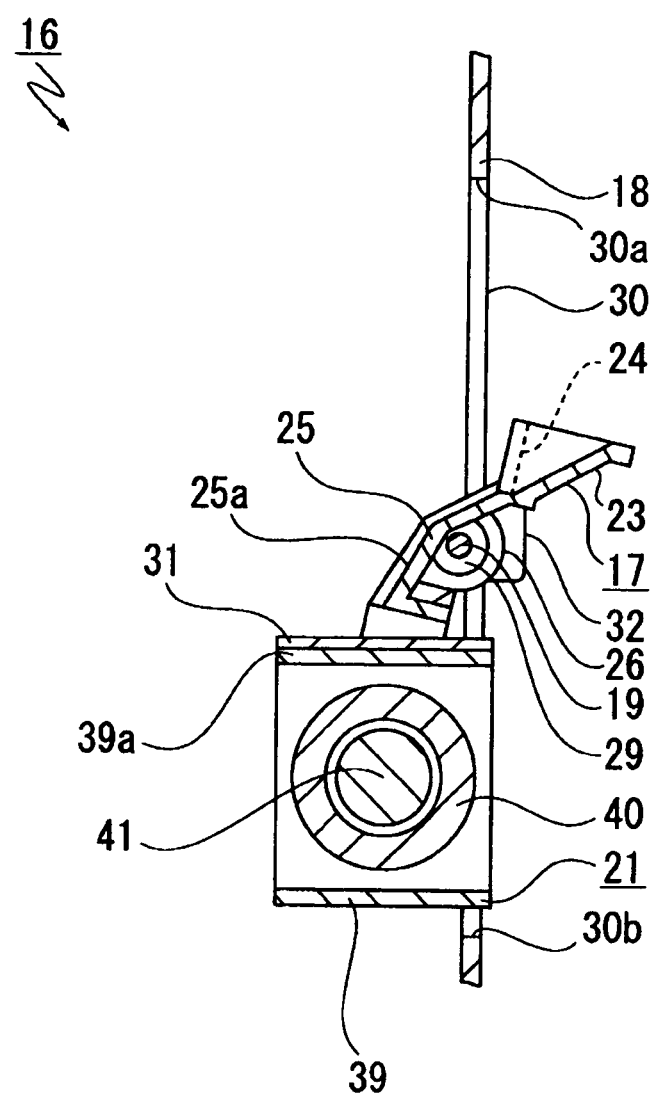
FIG. 4 is a longitudinal sectional view showing a state where the movable shade is held in a second position.

In a state where the pivot shaft 19 is fixed to the support plate 18, the light quantity control portion 23 is inserted through the light passing hole 30a, so that the movable shade 17 is disposed on the rear side of the support plate 18 and a lower side portion thereof is disposed on the front side of the support plate 18 (see FIG. 3 and FIG. 4). Accordingly, in the movable shade 17, an upper portion including an upper end is disposed on the rear side of the pivot shaft 19 and a lower portion including a lower end is disposed on the front side of the pivot shaft 19. The bearings 29, 29 are in a state where the large-diameter portions 29a, 29a are respectively in contact with the bearing pressing pieces 32, 32 of the support plate 18 from the inside. As a result, the movement in the left-right direction of the movable shade 17 relative to the pivot shaft 19 is regulated.

Since the pivot shaft 19 is fixed to the support plate 18, the movable shade 17 can be pivoted relative to the support plate 18 with the pivot shaft 19 as a support point. In this way, the movable shade 17 can be pivoted between a first position (see FIG. 3) where the movable shade shields at least a portion of light emitted from the light source 14 and a second position (see FIG. 4) where the shielding amount of the movable shade is smaller than in the first position. The first position refers to a position for forming a low-beam light distribution pattern that irradiates a short distance ahead of a vehicle. In the first position, the regulation protrusions 24, 24 of the movable shade 17 are in contact with the rear surface of the base surface portion 30 of the support plate 18. The second position refers to a position for forming a high-beam light distribution pattern that irradiates a long distance ahead of the vehicle. In the second position, the regulation protrusions 24, 24 of the movable shade 17 are spaced rearward from the base surface portion 30 of the support plate 18.

A biasing spring 35 that is a twisted coil spring is mounted on an outer peripheral surface of the pivot shaft 19. Both ends of the biasing spring 35 are engaged with the rear surface of the movable shade 17 and the support plate 18, respectively. Accordingly, the movable shade 17 is biased in a direction of being pivoted toward the first position from the second position by the biasing spring 35. The regulation protrusions 24, 24 are pressed against the rear surface of the base surface portion 30 by the biasing force of the biasing spring 35, so that the movable shade 17 is held in the first position.

The link member 20 includes a base portion 36 having a substantially triangular shape and a tabular sliding contact portion 37 (an example of a second sliding contact member) protruding laterally from the base portion 36 (see FIG. 2). A connection shaft portion 36a is provided on the front end of the base portion 36 and protruded downward. A supported hole 36b is formed on the rear end of the base portion 36 and penetrated in the vertical direction.

The support shaft 34 is inserted into the supported hole 36b of the link member 20 and a snap ring 38 is attached to a lower end of the support shaft 34. In this way, the link member 20 is pivotably supported on the support plate 18 with the support shaft 34 as a support point. In the state where the link member 20 is supported on the support plate 18, a portion of the link member 20 is arranged to be inserted through the placement hole 30b and the sliding contact portion 37 is abutted against the protrusion 28 of the movable shade 17.

The solenoid 21 functions as an actuator for pivoting the movable shade 17. The solenoid 21 includes a yoke case 39, a coil body 40 disposed inside of the yoke case 39, and an output shaft 41 movable in the left-right direction.

The yoke case 39 has a frame shape that is transversely long and penetrates back and forth.

The coil body 40 is arranged so that an axial direction thereof matches the left-right direction of the lamp unit 7. The coil body 40 is supplied with drive current from a power supply circuit (not shown).

The output shaft 41 is extended in such a way that an axial direction thereof matches the left-right direction of the lamp unit 7. A portion of the output shaft 41 is protruded laterally from the yoke case 39. An annular connection groove 41a is formed at a portion near the leading end of the output shaft 41. The output shaft 41 can be moved in an axial direction in accordance with the supply state of the drive current to the coil body 40.

An upper surface portion 39a of the yoke case 39 is attached to the mounting surface portion 31 of the support plate 18 by a screw fixation or the like. In the state where the upper surface portion 39a is attached to the mounting surface portion 31, a portion of the solenoid 21 is disposed in the placement hole 30b.

The connection shaft portion 36a is inserted into the connection groove 41a of the output shaft 41, so that the solenoid 21 is connected to the link member 20. Accordingly, when the output shaft 41 is moved in the axial direction in accordance with the supply state of the drive current to the coil body 40, the link member 20 is pivoted with the support shaft 34 as a support point and the protrusion 28 slides on the sliding contact portion 37. The movable shade 17 is pivoted about the pivot shaft 19, depending on the contact position of the protrusion 28 to the sliding contact portion 37.

The cover body 22 is attached to the front surface side of the support plate 18 by a screw fixation or the like. As the cover body 22 is attached to the support plate 18, the solenoid 21 is covered by the cover body 22.

The lamp unit 7 is tiltably supported to the lamp housing 2 via an aiming adjustment mechanism (not shown). Accordingly, the lamp unit 7 is tilted in the vertical direction or the left-right direction of the vehicle headlamp 1 by the operation of the aiming adjustment mechanism, so that the optical axis adjustment (initial adjustment) of the light source 14 is performed.

Further, the lamp unit 7 may be supported to the lamp housing 2 so as to be tiltable in the vertical direction of the vehicle headlamp 1, for example. In this case, a leveling adjustment mechanism (not shown) is connected to the lamp unit 7. The lamp unit 7 is tilted in the vertical direction of the vehicle headlamp 1 by the operation of the leveling adjustment mechanism, so that the direction of the optical axis of the light source 14 is adjusted in accordance with the weight of in-vehicle parts.

In addition, the lamp unit 7 may be pivoted in the left-right direction of the vehicle headlamp 1, for example. In this case, a swivel mechanism (not shown) is connected to the lamp unit 7. The lamp unit 7 is pivoted in the left-right direction of the vehicle headlamp 1 by the operation of the swivel mechanism, so that the direction of the optical axis is changed so as to follow a travelling direction of a vehicle.

In the state where the drive current is not supplied to the coil body 40 of the solenoid 21, the regulation protrusions 24, 24 are pressed against the base surface portion 30 of the support plate 18. Therefore, the movable shade 17 that is biased by the biasing spring 35 is held in the first position (see FIG. 3 and FIG. 5). At this time, the output shaft 41 of the solenoid 21 is disposed at the moving end in the direction protruding from the yoke case 39.

Figure 5:
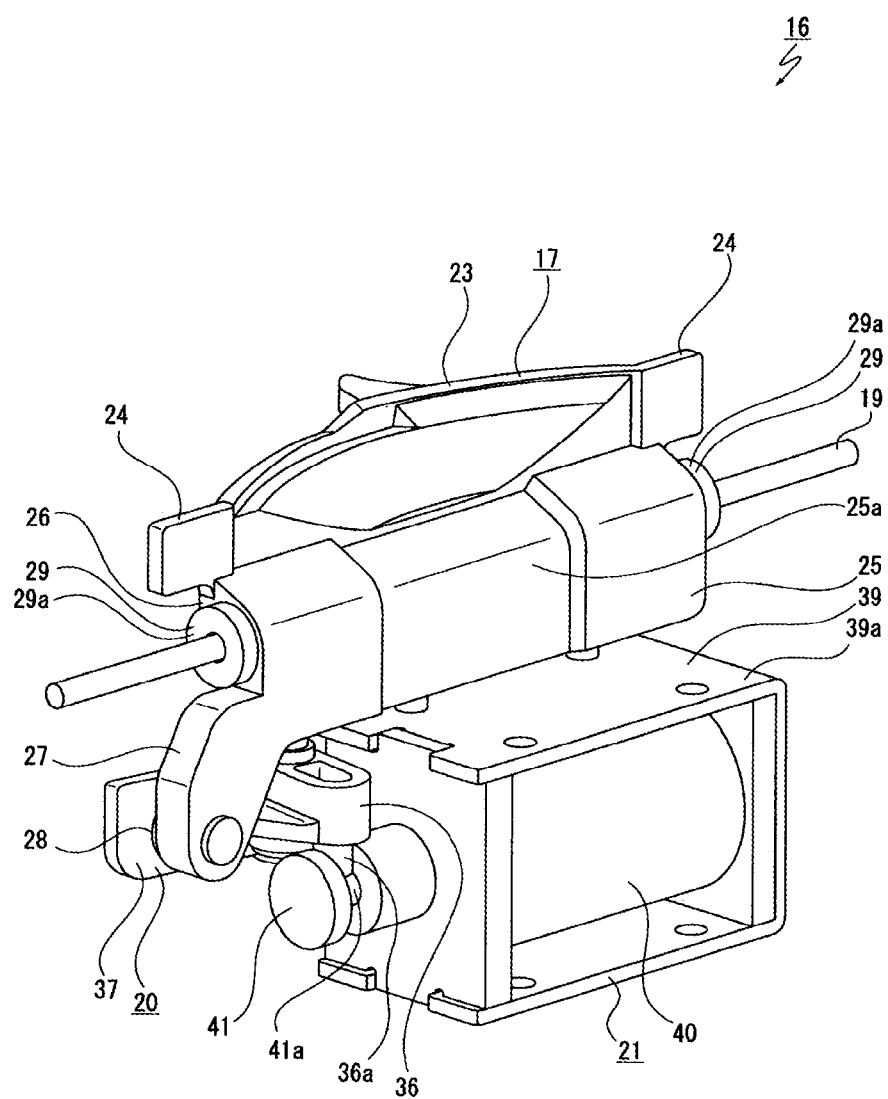
FIG. 5 is a perspective view showing a state where the movable shade is held in the first position.
Figure 6:
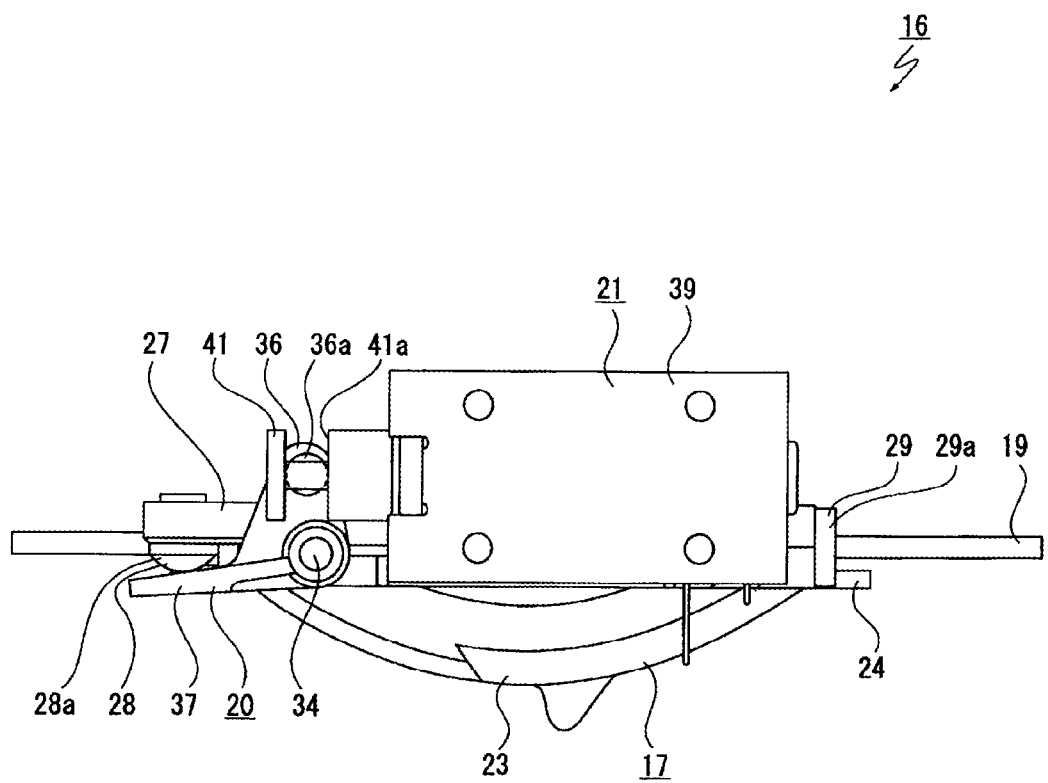
FIG. 6 is a bottom view showing a state where the movable shade is held in the first position.

The link member 20 is in a state where the sliding contact portion 37 is in a first pivot end located on the front side and the surface 28a of the protrusion 28 provided on the slide portion 27 of the movable shade 17 is abutted against the sliding contact portion 37 (see FIG. 5 and FIG. 6).

When light is emitted from the light source in the state where the movable shade 17 is in the first position, a portion of the light is shielded by the movable shade 17 and the light that is not shielded is incident on the projection lens 9. An end edge shape of the movable shade 17 is projected by the projection lens 9, so that the low-beam light distribution pattern for irradiating a short distance ahead of a vehicle is formed.

Figure 7:
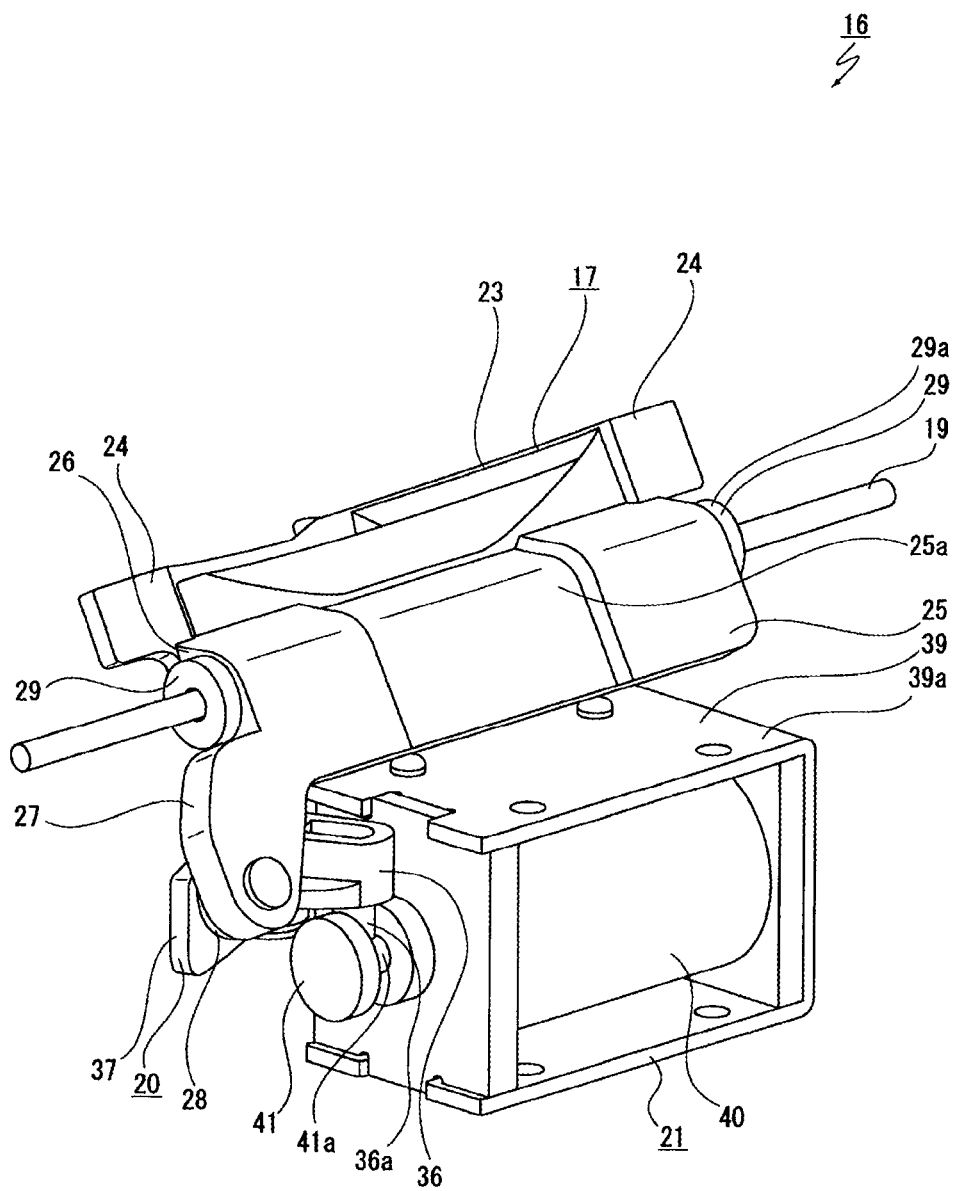
FIG. 7 is a perspective view showing a state where the movable shade is held in the second position.
Figure 8:
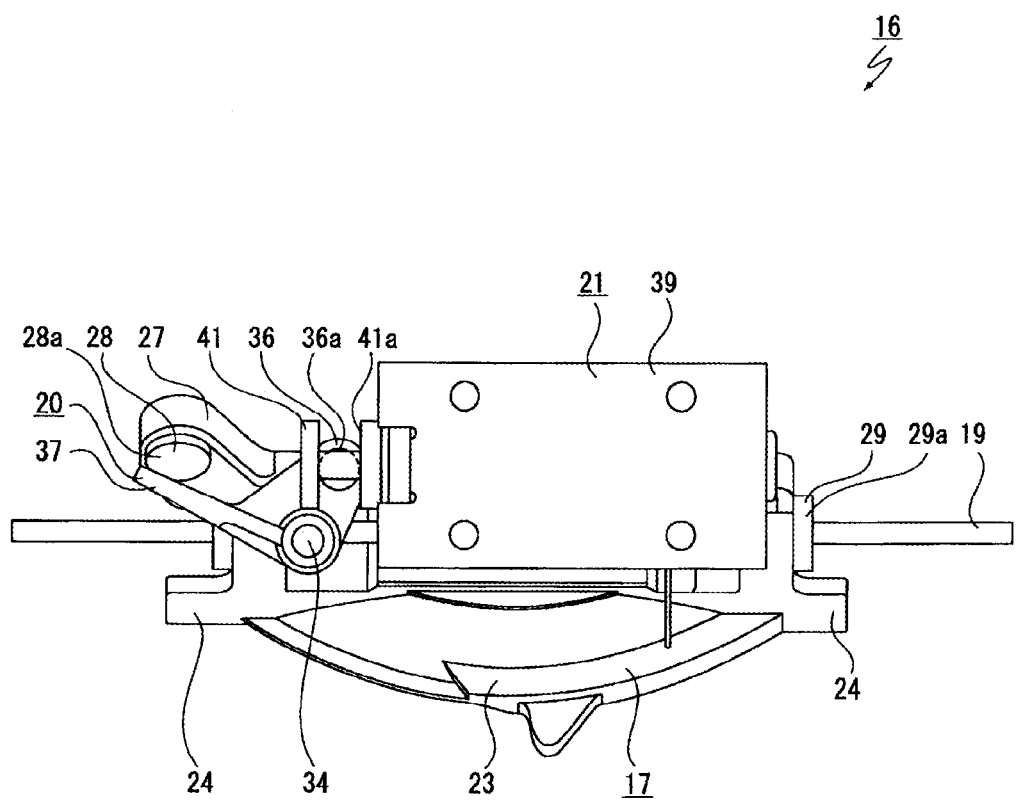
FIG. 8 is a bottom view showing a state where the movable shade is held in the second position.

When the energization to the coil body 40 of the solenoid 21 is made, the output shaft 41 is moved in a direction of being drawn into the yoke case 39 and the link member 20 is pivoted (an example of displacement) about the support shaft 34. The protrusion 28 of the movable shade 17 slides on the sliding contact portion 37 of the link member 20, depending on the link member 20. The movable shade 17 is pivoted about the pivot shaft 19 against the biasing force of the biasing spring 35 from the first position to the second position (see FIG. 4, FIG. 7 and FIG. 8).

As the movable shade 17 is pivoted to the second position, the shielded amount of the light emitted from the light source 14 is reduced. As a result, a high-beam light distribution pattern for irradiating a long distance ahead of a vehicle is formed.

When the energization to the coil body 40 is stopped, the movable shade 17 is pivoted about the pivot shaft 19 from the second position to the first position by the biasing force of the biasing spring 35. The link member 20 is pivoted in association with the pivoting of the movable shade 17. The output shaft 41 is moved to the moving end in the direction protruding from the yoke case 39 (see FIG. 3, FIG. 5 and FIG. 6).

Meanwhile, a portion of the light passing through the light passing hole 30a of the support plate 18 passes through the front surface side of the inclined surface portion 25. The inclined surface portion 25 is formed with the recess 25a. The formation of the recess 25a causes the light passing through the front surface side of the inclined surface portion 25 to be prevented from being unnecessarily reflected and shielded by the movable shade 17.

The lamp unit 7 according to the present embodiment includes the movable shade 17, the solenoid 21, and the link member 20. The movable shade 17 can be pivoted about the pivot shaft 19 and switches the shielded amount of light emitted from the light source 14 in accordance with the pivot amount. The solenoid 21 includes the output shaft 41 that is movable in the axial direction. The link member 20 is connected to the output shaft 41 of the solenoid 21 and displaced in association with the movement of the output shaft 41. The movable shade 17 is provided with the protrusion 28. The link member 20 is provided with the sliding contact portion 37 that is abutted against the protrusion 28. As the protrusion 28 slides on the sliding contact portion 37 by the displacement of the link member 20, the movable shade 17 is configured to be pivoted about the pivot shaft 19. The surface 28a of the protrusion 28 is configured as a curved surface.

According to this configuration, the surface 28a of the protrusion 28 sliding on the sliding contact portion 37 when the output shaft 41 is moved is configured as a curved surface. Therefore, the movable shade 17 is smoothly interlocked with the displacement of the link member 20. As a result, the operating efficiency of the movable shade 17 to the solenoid 21 is improved.

In this way, a small-sized solenoid 21 having a small driving force can be used. Further, the reduction in size of the solenoid 21 allows the biasing spring 35 for biasing the movable shade 17 to be smaller in accordance with the driving force of the solenoid 21. Accordingly, it is possible to reduce the cost of the biasing spring 35. As a result, it is possible to provide the small-sized vehicle headlamp 1 having the small-sized lamp unit 7 at low cost.

In the present embodiment, the protrusion 28 is provided on the slide portion 27 of the movable shade 17. On the contrary, the protrusion may be provided on the sliding contact portion 37 of the link member 20.

Further, in order to increase the slidability of the protrusion 28 and the sliding contact portion 37, the protrusion 28 or the sliding contact portion 37 may be formed of the high slidability material, integrally with or separately from the movable shade 17 or the link member 20.

In the present embodiment, an extension direction of the pivot shaft 19 of the movable shade 17 coincides with a movement direction of the output shaft 41 of the solenoid 21 (left-right direction of the lamp unit 7). According to this configuration, it is not required to secure a moving space of the output shaft 41 in a direction (front-rear direction of the lamp unit 7) perpendicular to the extension direction of the pivot shaft 19. As a result, it is possible to reduce the size of the lamp unit 7 in the front-rear direction while improving the operating efficiency of the movable shade 17.

In the present embodiment, the surface 28a of the protrusion 28 is formed as a portion of the curved surface. According to this configuration, the contact area between the protrusion 28 and the sliding contact portion 37 in the sliding contact is small, so that the link member 20 and the movable shade 17 are more smoothly interlocked. As a result, the operating efficiency of the movable shade 17 is further improved.

In the present embodiment, the sliding contact portion 37 has a plane in contact with the surface 28a of the protrusion 28. According to this configuration, the protrusion 28 and the sliding contact portion 37 are always in point-contact with each other, so that the link member 20 and the movable shade 17 are more smoothly interlocked. As a result, the operating efficiency of the movable shade 17 is further improved.

In the present embodiment, an upper end of the movable shade 17 is located on the front side of the pivot shaft 19 and a lower end of the movable shade 17 is located on the rear side of the pivot shaft 19.

According to this configuration, the pivot shaft 19 is disposed between the upper end and the lower end of the movable shade 17. Accordingly, the good weight balance of the movable shade is ensured without additionally providing a counterweight or the like. In this way, as the solenoid 21 for pivoting the movable shade 17, a small-sized solenoid having a small driving force can be used. As a result, it is possible to reduce the size of the lamp unit 7 while suppressing the increase in weight of the movable shade 17.

Furthermore, in the case where most of the movable shade 17 is located on the front side or rear side of the support plate 18, it is required to increase the size of the light passing hole 30a of the support plate 18 in order to secure a pivoting space of the upper end or the lower end of the movable shade 17.

However, according to the above-described configurations, the upper end and the lower end of the movable shade 17 move at the front and rear sides sandwiching the support plate 18 when the movable shade 17 is pivoted. Therefore, it is not necessary to form a space, at the support plate 18, for securing the pivoting space of the upper end and the lower end of the movable shade 17. As a result, the light emitted from the light source 14 can be suppressed from being leaked to the front of the support plate 18.

On the contrary, the lower end of the movable shade 17 may be located on the rear side of the pivot shaft 19 and the upper end thereof may be located on the front side of the pivot shaft 19.

However, in the case where the upper end of the movable shade 17 is located on the rear side of the pivot shaft 19 and the lower end thereof is located on the front side of the pivot shaft 19, it can be avoided that the lower end of the movable shade 17 is brought into contact with a portion of the light source unit 11 located on the rear side of the light quantity control portion 23. Accordingly, when reducing the size of the lamp unit 7 while suppressing the increase in weight of the movable shade 17, an effective usage of a space and an easy design can be achieved.

The lamp unit 7 according to the present embodiment includes the support plate 18. The support plate 18 includes a pair of light shielding portions 30c for shielding a portion of the light emitted from the light source 14. On the rear side of the movable shade 17, the pair of light shielding portions 30c are arranged so as to be spaced apart in the extension direction (left-right direction) of the pivot shaft 19. When light is emitted from the light source 14 in a state where the movable shade 17 is in the second position, the position of the lower end of the movable shade 17 is moved upward than in a state where the movable shade 17 is in the first position. Therefore, the light is made to easily pass through the lower side of the movable shade 17. At this time, the light distribution pattern is affected when the light passes forward from both left and right ends in the lower side of the movable shade 17. According to the above configuration, such light is shielded by the shielding portions 30c which are disposed on both left and right ends in the rear side of the inclined surface portion 25 of the movable shade 17. As a result, when reducing the size of the lamp unit 7 while suppressing the increase in weight of the movable shade 17, it is possible to suppress the influence on the light distribution pattern by the light passing through the lower side of the movable shade 17.

In the present embodiment, the biasing spring 35 for biasing the movable shade 17 toward the first position (an example of one direction) is disposed on the rear side of the movable shade 17. According to this configuration, it can be avoided that the light passing through the light passing hole 30a of the support plate 18 is reflected and shielded by the biasing spring 35 or a member for supporting the biasing spring 35. As a result, it is possible to form a good light distribution pattern even while suppressing the increase in weight of the movable shade 17 and reducing the size of the lamp unit 7.

All of the shape and structure of each part illustrated in the best mode for carrying out the invention described above merely show an example of a specific embodiment to be performed when implementing the present invention. The technical scope of the present invention is not restrictively interpreted by these shapes and structures.

For example, the vehicle headlamp 1 having the reflector 10 has been described as an example of one exemplary embodiment. However, the present invention may be applied to a so-called direct-projection type vehicle headlamp having no reflector.

A suitable actuator other than the solenoid 21 can be also used, so long as the actuator can pivot the movable shade 17. For example, an actuator where a position of an output shaft is changed by a motor and a gear mechanism may be used.

This application is based upon Japanese Patent Application No. 2013-013405 filed on Jan. 28, 2013 and Japanese Patent Application No. 2013-013406 filed on Jan. 28, 2013, the contents of which are incorporated herein by reference.

What is claimed is:

1. A vehicle lamp unit that is mounted on a vehicle, the lamp unit comprising:
   a light source;
   a movable shade that is capable of being pivoted about a pivot shaft and switches a shielded amount of light emitted from the light source in accordance with a pivot amount;
   an actuator having an output shaft that can be axially moved;
   a link member that is connected to the output shaft and displaced in conjunction with a movement of the output shaft;
   a first sliding contact member provided on the movable shade; and
   a second sliding contact member that is provided on the link member and abutted against the first sliding contact member,
   wherein the movable shade is configured to be pivoted about the pivot shaft when the first sliding contact member slides on the second sliding contact member in accordance with a displacement of the link member, and
   a surface of one of the first sliding contact member and the second sliding contact member is formed as a curved surface.

2. The vehicle lamp unit according to claim 1, wherein an extension direction of the pivot shaft coincides with a movement direction of the output shaft.

3. The vehicle lamp unit according to claim 1, wherein the curved surface is configured as a portion of a spherical surface.

4. The vehicle lamp unit according to claim 1, wherein the other of the first sliding contact member and the second sliding contact member has a plane in contact with the curved surface.

5. A vehicle headlamp that is mounted on a vehicle, the vehicle headlamp comprising:
   a lamp housing having an opening in at least one side;
   a cover defining a lamp chamber together with the lamp housing by covering the opening; and
   the vehicle lamp unit according to claim 1, the vehicle lamp unit being disposed in the lamp chamber.

* * * * *